United States Patent [19]
Weber et al.

[11] Patent Number: 4,639,589
[45] Date of Patent: Jan. 27, 1987

[54] OPTICAL SCANNING DEVICE, PARTICULARLY FOR SEEKER HEADS IN TARGET SEEKING MISSILES

[75] Inventors: Berthold Weber, Bodman; Peter Giesenberg, Salem; Johannes Steimel, Constance, all of Fed. Rep. of Germany

[73] Assignee: Bodenseewerk Gerätetechnik GmbH, Uberlingen, Fed. Rep. of Germany

[21] Appl. No.: 788,465

[22] Filed: Oct. 17, 1985

[30] Foreign Application Priority Data

Oct. 24, 1984 [DE] Fed. Rep. of Germany ....... 3438898

[51] Int. Cl.$^4$ ................................................. G01J 1/20
[52] U.S. Cl. ................................. 250/203 R; 250/236; 350/6.3
[58] Field of Search ............. 250/203 R, 234, 236, 250/334, 342; 244/3.16; 350/6.3, 6.9

[56] References Cited

U.S. PATENT DOCUMENTS

| | | |
|---|---|---|
| 4,009,393 | 2/1977 | Ashley, Jr. et al. ........ 250/203 R X |
| 4,030,807 | 6/1977 | Briney .......................... 250/203 R X |
| 4,039,246 | 8/1977 | Voigt ........................... 250/203 R X |
| 4,061,415 | 12/1977 | Taenzer ................................. 350/6.3 |
| 4,413,177 | 11/1983 | Godwin, Jr. et al. .......... 250/203 R |

Primary Examiner—Eugene R. LaRoche
Assistant Examiner—David Mis
Attorney, Agent, or Firm—Lee, Smith & Zickert

[57] ABSTRACT

An optical scanning device comprises a bearing portion (12), which is rotatably mounted in a base portion (10) about an axis of rotation (16). A holder (18) is rotatably mounted in the bearing portion (12) about an axis of rotation (22), which is eccentric with regard to the axis of rotation (16). A pair of lenses (26,38) is located eccentricly in the holder (18) and forms part of an imaging system, through which a field of view is imaged in the plane of a base portion-fixed detector. The bearing portion (12) and the holder (18) are driven in opposite directions.

7 Claims, 4 Drawing Figures

OPTICAL SCANNING DEVICE, PARTICULARLY FOR SEEKER HEADS IN TARGET SEEKING MISSILES

The invention relates to an optical scanning device for seeker heads in target seeking missiles, comprising
(a) a base portion,
(b) a detector located on the base portion,
(c) a holder rotatably mounted and driven about an axis of rotation, and
(d) an optical imaging system
  ($d_1$) adapted to image a field of view in the plane of the detector, and
  ($d_2$) comprising imaging optical means presenting rotation symmetry, which are arranged on the holder and define an optical axis, which extends eccentrically with regard to the axis of rotation of the holder.

Such optical scanning devices are particularly used in target seeking missiles, for example air-to-air rockets. A field of view is scanned along a usually rosette-shaped path. From the thus obtained signals the deviation of a target from the axis of the seeker is determined. The thus obtained deviation signals are used to align the seeker with the seeker axis to the target. Therein the seeker forms a system decoupled from the motions of the missile.

The rosette-shaped scanning path results from the superposition of two gyrating scanning motions of different rotary speeds and opposite directions of rotation. Various seekers having rosette-shaped scanning path are known.

U.S. Pat. No. 4,009,393 discloses a seeker having rosette-shaped path, in which the imaging optical system is formed by a lens arranged on the rotor. The optical axis of the lens extends eccentrically with regard to the axis of rotation of the rotor. This results in a gyrating scanning motion with the rotary speed of the rotor. The rotor is driven through a stator winding. A second gyrating scanning motion is provided by a prism, which is located in the path of rays on a sleeve surrounding the detector and rotatable about a longitudinal axis. This sleeve is driven by a separate motor independently of the rotor.

U.S. Pat. No. 4,030,807 discloses a seeker, in which the imaging system arranged on the rotor is formed as a Cassegrain system having a primary mirror facing the field of view and formed as an annular concave mirror, and a slightly convex secondary mirror facing the primary mirror. The rotor is gimbal suspended to pivot about a central point. The imaging system provides an image of the field of view in the area of this central point. One of the mirrors is slightly tilted with regard to the rotor axis, which results in a gyrating scanning motion with the rotary speed of the rotor. Through a missile-fixed objective the thus obtained image of the field of view is imaged in the plane of a detector through a plane mirror. The plane mirror is located on the end face of the shaft of a motor and is slightly tilted with regard to the axis of rotation of this shaft. This results in a second gyrating scanning motion with a rotary speed different from the rotary speed of the rotor.

U.S. Pat. No. 4,039,246 discloses a seeker, in which a Cassegrain system having an annular concave mirror as primary mirror and a plane mirror as secondary mirror facing this primary mirror likewise is provided as imaging system. There the optical axis of the primary mirror forms a small angle with the rotor axis. This results in a gyrating scanning motion with the rotary speed of the rotor. Furthermore the secondary mirror is slightly tilted and rotatably mounted with regard to the rotor. The secondary mirror is driven by a separate motor at a rotary speed different from the rotary speed of the rotor. This results in the superimposed second gyrating scanning motion, such that the field of view all in all is scanned along a rosette-shaped path.

U.S. Pat. No. 4,413,177 discloses a seeker having a Cassegrain system, in which the two gyrating scanning motions are provided by a single driving motor, namely the driving mechanism of the rotor. Also here the optical axis of the primary mirror is inclined with regard to the rotor axis, which results in the first gyrating scanning motion. As in the above discussed U.S. Pat. No. 4,039,246, the second gyrating scanning motion is obtained by tilting the secondary mirror. However, the secondary mirror is driven by the rotating rotor through a friction gear of the type of a planetary gear. The rotor is rotatably mounted about the rotor axis on an inner gimbal of a gimbal mounting. A window or a lens having a mounting is rotatably mounted in the inner gimbal. The secondary mirror is attached to the window by means of a central pin. The inner gimbal forms a cage for balls, which frictionally engage the rotor as well as the mounting of the window. Then the rotor acts as the ring gear of a planetary gear, the mounting acts as sun gear and the balls have the function of the planet wheels. This results in a stepping up of the rotary speed. The secondary mirror runs faster than the rotor.

EP No. A-79 684 discloses an optical seeker for target seeking missiles, with which a field of view is scanned along a rosette-shaped path. The seeker comprises an optical imaging system, which is formed as a Cassegrain system having an annular concave mirror as primary mirror and a plane mirror as secondary mirror opposing the primary mirror. The optical system is located on a rotor, which rotates about its figure axis and which is pivotable with its figure axis with two degrees of freedom about a central point through a gimbal mounting. The field of view is imaged in a first image plane through the concave mirror and the plane mirror as well as through a further convex mirror opposing the plane mirror and through a further plane mirror. The first image plane is imaged through a lens system in a second image plane, in which the detector is located. The detector is arranged in a housing-fixed manner in the central point. The lens system comprises a first and a second lens, both optical axes of which coincide with the rotor axis. The path of rays is parallel between the two lenses. Said further convex mirror is located on a mounting accommodating the first and the second mirror. The rotor is rotatably mounted about its figure axis on the mounting. Thus the lens system is always aligned toward the figure axis of the rotor when the rotor is swivelling. The mounting is connected to the rotor through a planetary gear. The planetary gear is constructed in a manner similar to that described above with reference to U.S. Pat. No. 4,413,177. Due to this the mounting of the lens system with the annular mirror rotates faster than the rotor and in opposite direction. The secondary mirror of the Cassegrain system is slightly tilted with regard to the rotor axis, about which the rotor rotates. This results in a gyrating scanning motion with the rotary speed of the rotor. Also the convex mirror on the mounting of the lens system is slightly tilted with regard to the rotor axis. This results in a gyrating scanning motion of higher rotary speed and superimposed to the first scanning motion. The two mirrors cause each point of the image of the field of view to describe a rosette-shaped path relative to the detector.

Furthermore optical seekers are known, with which a field of view is scanned along a rectilinear path. Therein the path of rays includes a vibrating optical member, for example a vibrating mirror. The thus occurring inertia forces can lead to deformations or vibrations, which in turn can result in inaccuracies of the image and the signal evaluation. With high image frequency, high drive power is required, which cannot be provided in many, for example military applications.

It is the object of the invention to provide an optical scanning device of the above defined type, which is compact and rigid and easy to balance, and with which the drive power can be kept low.

A more specific object of the invention is to provide an optical scanning device of this type, which permits a field of view to be scannned along a rectilinear path.

According to the invention this object is achieved in that (e) the holder is mounted in a bearing portion rotatably mounted and driven about an axis of rotation with regard to the base portion, and (f) the axis of rotation of the holder extends eccentrically with regard to the axis of rotation of said bearing portion.

Therein the holder and the bearing portion can be compactly arranged one inside the other, resulting in a rigid structure. The motion of the optical means results alone from rotary movements of the holder and the bearing portion, a dynamic balance being possible. The drive power does not have to accelerate or retard any masses but practically just to overcome the bearing friction. Thus, low drive power will be sufficient. The heat loss power is correspondingly reduced.

The particular object to scan a field of view along a rectilinear path, can be achieved with such a scanning device in that (a) the holder and the bearing portion are driven in opposite directions at the same rotary speed, and (b) the eccentricity between the axes of rotation of the holder and the bearing portion is equal to the eccentricity between the axis of rotation of the holder and the optical axis of the imaging optical means arranged thereon.

Modifications of the invention are subject matter of the further sub-claims.

An embobiment of the invention will now be described in greater detail with reference to the accompanying drawings.

Figure 1:
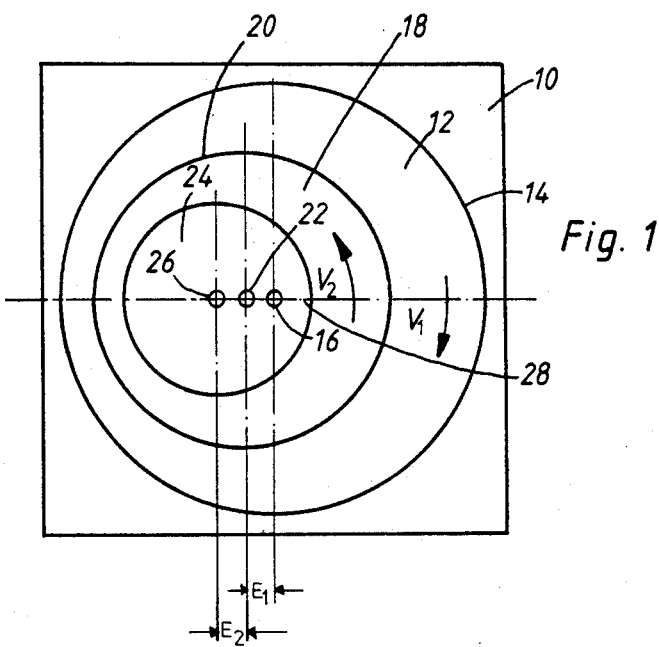
FIG. 1 illustrates the principle of the scanning device.

In the schematical illustration of FIG. 1, numeral 10 designates a base portion or a housing. In the base portion 10 a cylindrical bearing portion 12 is rotatably mounted in a bearing 14 about an axis of rotation 16. In the bearing portion 12 a cylindrical holder 18 is rotatably mounted in a bearing 20 about an axis of rotation 22. The axis of rotation 22 is displaced by an eccentricity $e_1$ with regard to the axis of rotation 16. Optical means 24 presenting rotation symmetry, for example a lens or a lens system, are located on or in the holder 18. The optical means 24 define an optical axis 26. The optical axis 26 extends eccentrically by an eccentricity $e_2$ with regard to the axis of rotation 22 of the holder 18 and parallel to this axis of rotation 22. The two eccentricities $e_1$ and $e_2$ are equal in the embodiment illustrated in FIG. 1. The bearing portion 12 is driven clockwise at a rotary speed $n_1$. The holder 18 is driven counter-clockwise at a rotary speed $n_2$. It can be shown that, when $n_1 = n_2$, then the optical axis 26 of the imaging optical means 24 reciprocates on a rectilinear path 28 of the length $4 e_1$. Thus a field of view is scanned along a rectilinear path.

When the rotary speeds $n_1$ and $n_2$ are unequal, then the optical axis 26 of the imaging optical means 24 follows a rosette-shaped path. When the eccentricities $e_1$ and $e_2$ are unequal, this results in trajectories, which do not interest the axis 16. The field of view is scanned similarly as in the above described prior art arrangements along a rosette-shaped path. However, this scanning is effected by means of one single optical member (or a group of optical members moved together).

Figure 2:
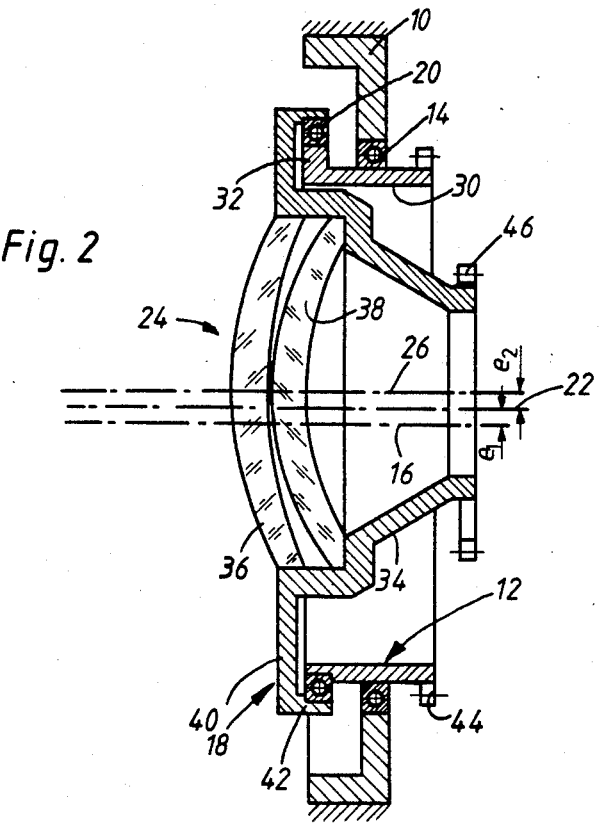
FIG. 2 shows schematically a longitudinal section through the scanning device.

In FIG. 2 the construction of an optical scanning device of the present type is schematically illustrated in a logitudinal section. Corresponding elements are designated in FIG. 2 by the same numerals as in FIG. 1.

The bearing poriton 12 is formed as a cylindrical sleeve 30, which is rotatably mounted in the base portion 10 about the axis of rotation 16 through the bearing 14 formed as a ball bearing. An eccentric 32 with the eccentricity $e_1$ is located at one end of the sleeve 30. The holder 18 is rotatably mounted on this eccentric 32 about the axis of rotation 22 through the bearing 20 formed as a ball bearing. The holder 18 comprises a mounting 34, in which a pair of lenses 36 and 38 are located as imaging optical means 24. The lenses 36 and 38 define an optical axis 26. An eccentric 40 having the eccentricity $e_2$ with regard to the optical axis 26 is connected to the mounting 34. The eccentric 40 extends with a bent off edge 42 over the bearing 20 and the eccentric 32. In this way the holder 18 is mounted on the eccentric 32 about the axis of rotation 22 through the bearing 20. The lenses 36,38 are in turn arranged eccentrically with regard to the bearing 20 through the eccentric 40. The optical axis 26 is displaced by the eccentricity $e_2$ with regard to the axis of rotation 22.

A gear rim 44 is provided on the bearing portion 12. The gear rim 44 is located on the sleeve 30 on its side remote from the eccentric 32. The gear rim 44 is concentric to the axis of rotation 16 of the bearing portion 12. A further gear rim 46 is formed on the holder 34. The gear rim 46 is located on the mounting 36 and is, however, concentric to the axis of rotation 22 of the mounting 34.

Figure 3:
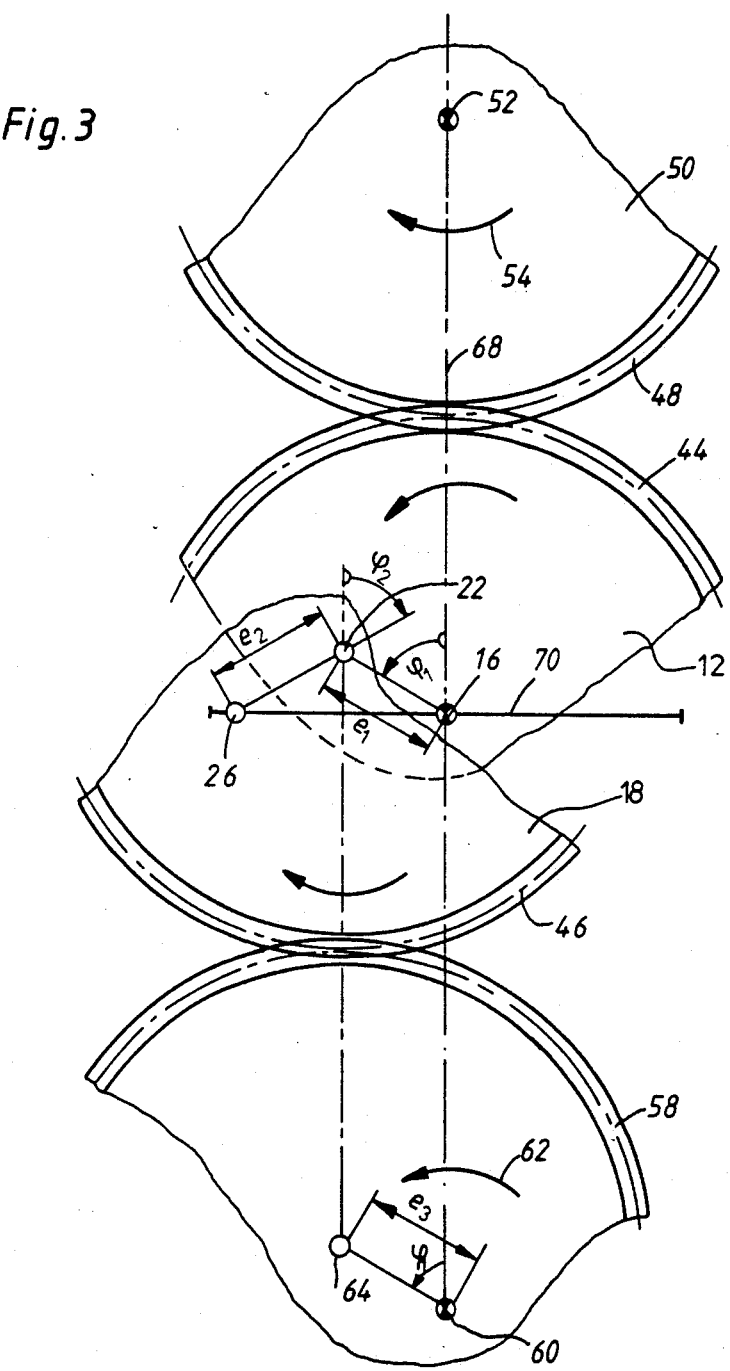
FIG. 3 shows schematically a driving mechanism of the scanning device, causing scanning along a rectilinear path.

FIG. 3 is a schematic illustration and shows a gearing for driving the bearing body 12 and the holder 18. Corresponding elements are designated in FIG. 3 by the same numerals as in FIGS. 1 and 2.

A first gear rim 48 on a gear wheel 50 is adapted to be driven about a base portion-fixed drive shaft 52 in the direction of the arrow 54, that is clockwise. The gear rim 48 is concentric to the drive shaft 52. The second gear rim 44 is attached to the bearing portion 12 concentrically to its axis of rotation 16, as it is already illustrated in FIG. 2. The second gear rim 44 is in mesh with the first gear rim 48.

A third gear rim 58 is adapted to be driven about a base portion-fixed drive shaft 60 in the direction of the arrow 62, that is counter-clockwise. The third gear rim 58 is eccentric with regard to this regard to this drive shaft 60 with an eccentricity $e_3$, which is equal to the eccentricity $e_1$ between the axes of rotation 22 and 16 of the bearing portion 12 and the holder 18, respectively. The central point of the third gear rim 58 is designated by 64. The fourth gear rim 46 is attached to the holder 18 concentrically to its axis of rotation 22. The optical axis of the imaging optical means 24 (not illustrated here) is designated by 26 also in FIG. 4. The bearing portion 12 rotates clockwise at the same rotary speed as the third gear rim (58). Thereby the connecting lines between the axes of rotation 16 and 22 and between the drive shaft 60 and the central point 64, respectively, remain always parallel during the rotation, and accordingly also the distance of tha axis of rotation 22 and the central point 64 remains constant. The gear rims 46 and 58 are always in engagement.

The diameters of the circles of contact of the third gear rim 58 and the fourth gear rim 46 are equal.

The described arrangement operates as follows:

The position of the optical axis 26 relative to the base portion 10 results from the rotary movement of the axis of rotation 22 about the base portion-fixed axis of rotation 16 and the rotary movement of the holder 18 about the axis of rotation 22. Starting from a position, in which the optical axis 26 coincides with the axis of rotation 16 of the bearing portion 12, the eccentricities $e_1$ and $e_2$ are superimposed and the axis of rotation 22 is located in the connecting plane 68 of the base portion-fixed axes of rotation 16 and 60, then, after a certain time, the bearing portion 12 is rotated through an angle $\phi_1$ about the axis of rotation 16, as it is illustrated in FIG. 3. The holder 18 is rotated through an angle $\phi_2$ about the axis of rotation 22.

The gear rim 58 rotates with constant rotational speed about the drive shaft 60, that is not about the central point 64. The distance between the drive shaft 60 and the point of engagement of the gear rims 46 and 48 varies during a revolution. Thereby also the circumferential speed in the point of engagement relative to the base portion 10 varies. As the diameters of the circles of contact of the gear rims 46 and 58 are equal, this irregularity of the circumferential speed compensates the irregularity, which would result from the gyrating motion of the axis of rotation 22 about the axis of rotation 16. Thus, the holder 18 is rotaed with regard to the base portion 10 in opposite direction of rotation through the same angle, through which the bearing portion 12 is rotated. It is $\phi_2 = \phi_1$. At the end of the eccentricity $e_2$ the optical axis 26 is pivoted upward in FIG. 3 with regard to the axis of rotation 22 by the same angle, by which the axis of rotation 22 is pivoted downward in FIG. 3 at the end of the eccentricity $e_1$ of the same size. Thus the optical axis 26 reciprocates rectilinearly in the plane 70.

Figure 4:
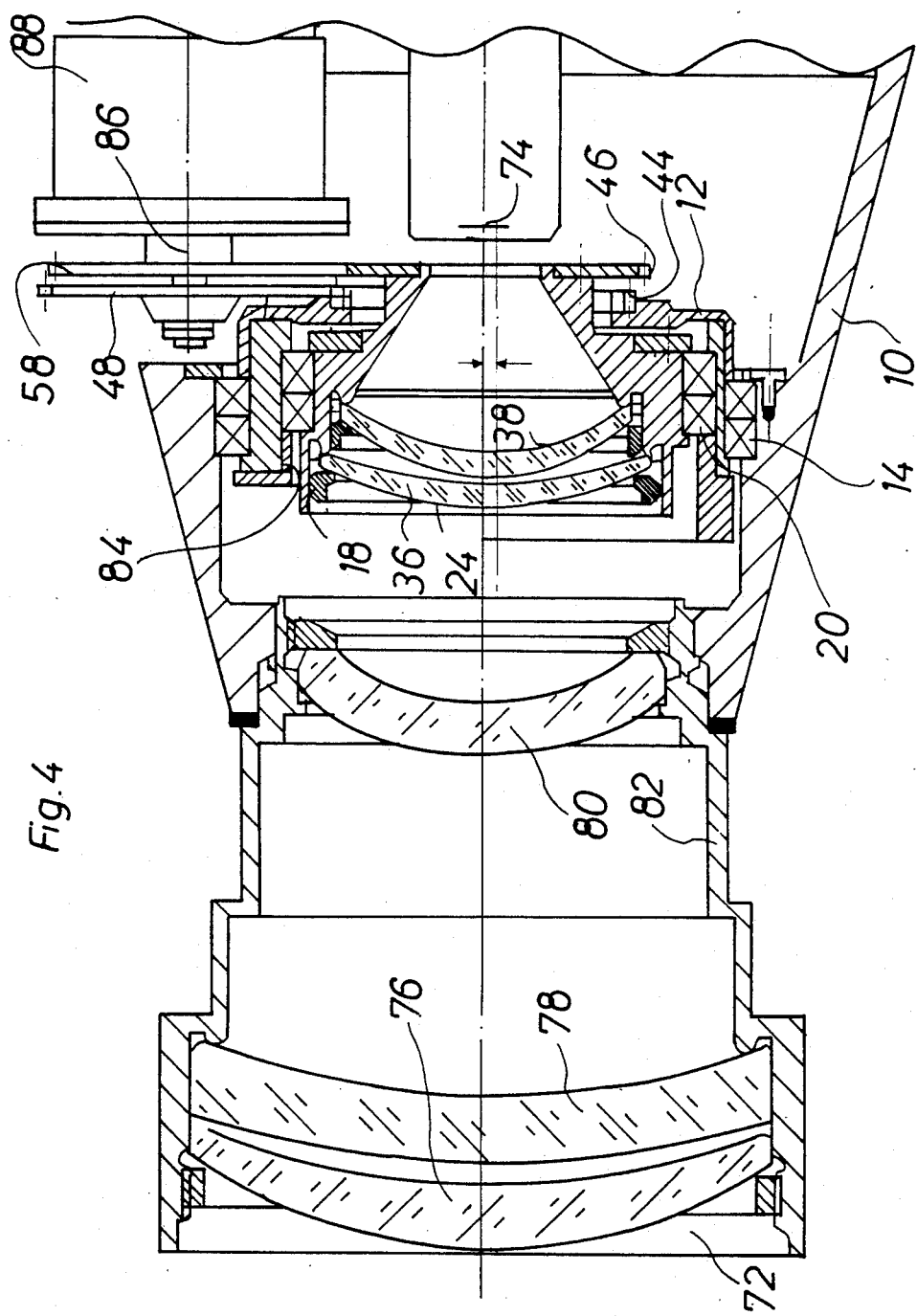
FIG. 4 shows a constructive embodiment of the scanning device.

FIG. 4 shows a construction of an optical scanning device, as it is used in a seeker head for a target seeking missile. Also here corresponding elements are designated by the same numerals as in the other figures. The optical imaging system 72, by means of which a field of view located at infinity is imaged in the plane of a detector 74, comprises lenses 76, 78 and 80 as well as the movable lenses 36 and 38. The base portion 10 forms a mounting 82, in which the lenses 76, 78 and 80 are supported. The bearing portion 12 is mounted in the base portion 10 through ball bearings 14. It forms a ring having an eccentric bore 84. The holder 18 is mounted in this eccentric bore 84 through ball bearings 20. The holder forms a mounting for the lenses 36 and 38, which are arranged eccentrically with regard to the ball bearings 20.

The gear rim 44 is located on the bearing portion 12, which gear rim 44 surrounds one end of the holder 18. The gear rim 46 is located at the end of the holder 18 beside the gear rim 44 and eccentric with regard thereto. A gear wheel with the gear rim 48 is arranged concentrical on the shaft 86 of a gear motor 88 and is in engagement with the gear rim 44 of the bearing body 12. A gear wheel with the gear rim 58 is arranged eccentrically on the shaft 86 and is an engagement with the gear rim 46 of the holder 18.

The position of the lenses 36 and 38 relative to the optical axis of the seeker head can be read-out by means of a code disc on the gear motor 88.

A modified embodiment is obtained when the optical means 24 has an imaging system corresponding to the lenses 36,38, which is mounted on the holder 18 centrally to the axis of rotation 22, as well as a prism, through which the optical axis of the optical means 24 is laterally displaced with regard to the axis of rotation in the plane of the detector 74.

We claim:

1. Optical scanning device, particularly for seeker heads in target seeking missiles, comprising
    (a) a base portion (10),
    (b) a detector (74) located on the base portion (10),
    (c) a holder (18) rotatably mounted and driven about an axis or rotation (22), and
    (d) an optical imaging system (72)
        ($d_1$) adapted to image a field of view in the plane of the detector (74), and
        ($d_2$) comprising imaging optical means (24) presenting rotation symmetry, which are arranged on the holder (18) and define an optical axis (26), which extends eccentrically with regard to the axis of rotation (22) of the holder (18),
    characterized in that
    (e) the hodler (18) is mounted in a bearing portion (12) rotatably mounted and driven about an axis of rotation (16) with regard to the base portion (10), and
    (f) the axis of rotation (22) of the holder (18) extends eccentrically with regard to the axis of rotation (16) of said bearing portion (12).

2. Scanning device as set forth in claim 1, characterized in that the holder (18) and the bearing portion (12) are adapted to be driven independently of each other.

3. Scanning device as set forth in claim 2, characterized in that the holder (18) and the bearing portion (12) are driven at different rotary speed.

4. Scanning device as set forth in claim 2, characterized in that
    (a) the holder (18) and the bearing portion (12) are driven in opposite directions at the same rotary speed, and
    (b) the eccentricity ($e_1$) between the axes of rotation (22,16) of the holder (18) and the bearing portion (12) is equal to the eccentricity ($e_2$) between the axis of rotation (22) of the holder (18) and the optical axis (26) of the imaging optical means (24) arranged thereon.

5. Scanning device as set forth in claim 4, characterized in that, for driving the holder (18) and the bearing portion (12),
- (a) a first gear rim (48) is provided, which is adapted to be driven about a base portion-fixed drive shaft (52) and which is concentric to this drive shaft (52), and
- (b) a second gear rim (44), which
  - ($b_1$) is attached to the bearing portion (12) concentrically to its axis of rotation (16) and
  - ($b_2$) is in engagement with the first gear rim (48),
- (c) a third gear rim (58), which
  - ($c_1$) is adapted to be driven about a base portion-fixed drive shaft (60) and
  - ($c_2$) is eccentric with regard to this drive shaft (60) with an eccentricity ($e_3$), which is equal to the eccentricity ($e_1$) between the axes of rotation (22,16) of the holder (18) and the bearing portion (12), and
- (d) a fourth gear rim (46), which
  - ($d_1$) is attached to the holder (18) concentrically to its axis of rotation (22) and
  - ($d_2$) is in engagement with the third gear rim (58), and
- (e) the bearing portion (12) rotates at the same rotary speed as the third gear rim (58) but in opposite direction.

6. Scanning device as set forth in claim 5, characterized in that the diameters of the circles of contact of the third and the fourth gear rim (58 and 46, respectively) are equal.

7. Scanning device as set forth in claim 1, characterized in that the optical means (24)
- (a) have an imaging system attached to the holder (18) centrally to the axis of rotation (22) and
- (b) a prism, which laterally displaces the optical axis of the optical means (24) in the plane of the detector (74) with regard to the axis of rotation (22).

* * * * *